(12) United States Patent
Hayakawa et al.

(10) Patent No.: US 11,420,684 B2
(45) Date of Patent: Aug. 23, 2022

(54) FRONT END STRUCTURE

(71) Applicant: HONDA MOTOR CO., LTD., Tokyo (JP)

(72) Inventors: Kimihito Hayakawa, Wako (JP); Kohki Sugawara, Wako (JP); Shuichi Uchiyama, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 254 days.

(21) Appl. No.: 16/884,103

(22) Filed: May 27, 2020

(65) Prior Publication Data
US 2020/0385066 A1 Dec. 10, 2020

(30) Foreign Application Priority Data
Jun. 4, 2019 (JP) .............................. JP2019-104411

(51) Int. Cl.
*B62D 25/08* (2006.01)
*B62D 25/12* (2006.01)

(52) U.S. Cl.
CPC ......... *B62D 25/085* (2013.01); *B62D 25/084* (2013.01); *B62D 25/12* (2013.01)

(58) Field of Classification Search
CPC .... B62D 25/08; B62D 25/082; B62D 25/084; B62D 25/085; B62D 25/12

(Continued)

(56) References Cited

U.S. PATENT DOCUMENTS 9,630,655 B1 * 4/2017 Lee ..................... B62D 29/046
2002/0014322 A1 * 2/2002 Ozawa .................. B60K 11/04
165/41

(Continued)

FOREIGN PATENT DOCUMENTS

CN 101559787 10/2009
CN 103046852 4/2013

(Continued)

OTHER PUBLICATIONS

Computer translation of EP 1698520 (Year: 2006).*
Chinese Office Action for Chinese Patent Application No. 202010439829.7 dated Mar. 9, 2022.

*Primary Examiner* — Gregory A Blankenship
(74) *Attorney, Agent, or Firm* — Amin, Turocy & Watson, LLP

(57) ABSTRACT

What is provided is a front end structure which can secure a strength and rigidity of a frame portion and reduce a weight thereof. The front end structure includes a frame portion (45), a vehicle body mounting portion (46), and a duct portion (42). The frame portion is formed to cover outer peripheral portions of a radiator and a condenser disposed in front of the vehicle body. The vehicle body mounting portion is provided on the frame portion and is connected to a front end of a front side frame (23) which extends in a forward and rearward direction of a vehicle body. The duct portion is continuous with the front end of the frame portion, and at least a part thereof is disposed above the vehicle body mounting portion and forms a continuous flow path between the duct portion and the condenser in a vertical direction. The frame portion, the vehicle body mounting portion, and the duct portion are integrally formed.

7 Claims, 11 Drawing Sheets

(58) Field of Classification Search
 USPC .................................................. 296/193.09
 See application file for complete search history.

(56) References Cited

U.S. PATENT DOCUMENTS

| | | | |
|---|---|---|---|
| 2005/0134093 A1* | 6/2005 | Borkowski | B62D 25/084 |
| | | | 296/203.02 |
| 2007/0107677 A1 | 5/2007 | Ito et al. | |
| 2014/0132033 A1* | 5/2014 | Townson | B62D 27/06 |
| | | | 296/193.1 |
| 2018/0015958 A1* | 1/2018 | Nagayoshi | B62D 25/084 |
| 2018/0178845 A1* | 6/2018 | Hayashi | B62D 21/152 |
| 2018/0186417 A1* | 7/2018 | Carroll | B62D 65/16 |
| 2021/0024133 A1* | 1/2021 | Kim | B62D 21/155 |

FOREIGN PATENT DOCUMENTS

| | | | | |
|---|---|---|---|---|
| CN | 105283337 | | 1/2016 | |
| EP | 1698520 | * | 2/2006 | ........... B62D 25/084 |
| JP | 2003-341549 | | 12/2003 | |
| JP | 6383811 | | 8/2018 | |
| KR | 10-2006-0119544 | | 11/2006 | |
| KR | 10-2007-0066278 | | 6/2007 | |
| KR | 10-2012-0131716 | | 12/2012 | |

* cited by examiner

FRONT END STRUCTURE

CROSS-REFERENCE TO RELATED APPLICATION

Priority is claimed on Japanese Patent Application No. 2019-104411, filed Jun. 4, 2019, the content of which is incorporated herein by reference.

BACKGROUND OF THE INVENTION

Field of the Invention

The present invention relates to a front end structure.

Description of Related Art

A front end structure includes, for example, a frame portion which supports a heat exchanger such as a condenser or a radiator, and is mounted on front end portions of right and left front side frames via support parts (vehicle body mounting parts). The frame portion is formed in a rectangular frame in a front view by right and left side stays (side leg parts), an upper beam (an upper beam part) which connects upper ends of the side stays in a right and left direction, and a lower beam (a lower beam part) which connects lower ends of the side stays in the right and left direction.

As disclosed in Japanese Patent No. 6383811, a frame portion in which the right and left side stays and the lower beam are formed in a U shape with a resin material, and the upper beam is press-formed of a metal material is known. According to such a constitution, the weight of the frame portion (that is, the front end structure) can be reduced by forming the right and left side stays and the lower beam with a resin. Further, the rigidity of the frame portion (that is, the front end structure) can be ensured by press-forming the upper beam with a metal material.

SUMMARY OF THE INVENTION

However, in the above-described related art, since the front end structure is formed of a resin component and a metal component, the number of components of the front end structure increases. Furthermore, since a part of the frame portion is formed of a metal, there is still room for improvement in weight reduction.

An object of the present invention is to provide a front end structure which is able to secure a strength and rigidity of a frame portion and reduce a weight thereof.

A front end structure according to the present invention employ the following configurations.

(1) A front end structure (for example, a front end structure (21) of an embodiment) according to an aspect of the present invention includes a frame portion (for example, a frame portion 45 of the embodiment) which covers an outer peripheral portion of a heat exchanger (for example, a radiator 91 and a condenser 92 of the embodiment) disposed at a front portion of a vehicle body, a vehicle body mounting portion (for example, a vehicle body mounting portion 46 of the embodiment) provided on the frame portion and connected to a front end portion of a front side frame (for example, a front side frame 23 of the embodiment) which extends in a forward and rearward direction of the vehicle body, and a duct portion (for example, a duct portion 42 of the embodiment) which is continuous with a front end of the frame portion, at least a part of which is disposed above the vehicle body mounting portion, and which forms a flow path (for example, a flow path 64 of the embodiment) that is continuous in a vertical direction between thereof and the heat exchanger, wherein the frame portion, the vehicle body mounting portion, and the duct portion are integrally formed.

(2) In the front end structure according to the aspect of (1), an introduction port (for example, a first introduction port 61 and a second introduction port 62 of the embodiment) which communicates with the flow path may be formed at a lower portion of the duct portion, and a partition portion (for example, a partition portion 43 of the embodiment) which partitions between a heat exchange area (for example, a condenser core 121 and a radiator core 101 of the embodiment) through which external air may be able to pass in a forward and rearward direction, and an outer peripheral area (for example, a radiator tank 100 or a condenser tank 120 of the embodiment) located on an outer peripheral side with respect to the heat exchange area in the heat exchanger may be provided at at least one of the frame portion and the duct portion.

(3) In the front end structure according to the aspect of (2), the partition portion may extend in a rib shape following the frame portion and protrude rearward.

(4) In the front end structure according to the aspect of any one of (1) to (3), the duct portion may be located forward from the vehicle body mounting portion.

(5) In the front end structure according to the aspect of any one of (1) to (4), a reinforcing rib (for example, a reinforcing rib 145 of the embodiment) which extends in a right and left direction as it goes downward from a center portion in the right and left direction in a portion of the frame portion located near an upper wall portion (for example, an upper wall portion 45*a* of the embodiment) may be provided at the duct portion.

(6) In the front end structure according to the aspect of any one of (1) to (5), a thickness of the frame portion may decrease toward the duct portion to enlarge the flow path.

(7) In the front end structure according to the aspect of any one of (1) to (6), a bracket (for example, a second bracket 29 of the embodiment) coupled to an upper end of a side wall portion (for example, a side wall portion 45*b* of the embodiment) of the frame portion and connected to an upper member (for example, an upper member 27 of the embodiment) to which a damper base (for example, a damper base 26 of the embodiment) is coupled, and a hood lock (for example, a hood lock 35 of the embodiment) provided on the bracket may be included.

According to the aspect of (1), since the frame portion, the vehicle body mounting portion, and the duct portion are integrally formed, the frame portion, the vehicle body mounting portion, and the duct portion can be formed as an integral part by, for example, injection molding or hot press molding of a resin. Further, in the duct portion, a strength of the frame portion can be increased, and a rigidity of the frame portion can be ensured by molding the frame portion and the duct portion as an integral part.

Further, as compared with a case in which the integrally formed frame portion, vehicle body mounting portion and duct portion are formed using a resin component and a metal component, the number of parts can be reduced, a weight can be reduced, and productivity can be improved by integrally forming the frame portion, the vehicle body mounting portion and the duct portion with a resin or the like.

Further, at least a part of the duct portion is disposed above the vehicle body mounting portion, and the vehicle body mounting portion is connected to a front end portion of the front side frame. Therefore, the duct portion is provided on the front end sides of both right and left front side frames via the vehicle body mounting portion. Thus, for example, when a load is applied to the front end portions of the right and left front side frames in vertically opposite directions due to vibration of a power plant or vibration of traveling, vibration of both the right and left front end portions of the front side frames or the frame portion in the vertically opposite directions can be curbed by the duct portion.

According to the aspect of (2), external air introduced into the introduction port can be guided to the flow path, and the guided external air can be blocked by the partition portion. Therefore, it is possible to suppress external air from bypassing the heat exchange area. Thus, since the external air can be actively guided and passed through the heat exchange area, cooling performance of the heat exchanger can be improved.

In addition, since the introduction port is formed in only a lower portion of the duct portion, a front opening portion of the vehicle body can be reduced in size. As a result, air resistance can be reduced, and an exterior can be improved. In particular, in the case of an electric vehicle, the required cooling capacity is smaller than that of a vehicle equipped with an internal combustion engine. Therefore, the efficiency of the cooling performance of the heat exchanger can be increased, and a size thereof can be reduced.

According to the aspect of (3), the rigidity of the frame portion can be ensured by reinforcing the frame portion with the partition portion. Further, since the flow path can be restricted over a wide range by the partition portion, the external air can be appropriately dispersed (diffused) in directions in two dimensions along the duct portion surrounded by the partition portion. Thus, the external air can be actively guided to the heat exchange area, and the cooling performance of the heat exchanger can be improved.

According to the aspect of (4), vibrations in the vertical direction are transmitted from the right and left front side frames to the vehicle body mounting portion. For example, the transmitted vibrations in the vertical direction act on the right and left side wall portions of the frame portion. Here, the vehicle body mounting portion is connected to the front end portion of the front side frame. Therefore, the duct portion can be disposed forward from the front end portion of the front side frame. Thus, the vibration acting on the right and left side wall portions can be curbed over the entire (the entire surface) of the duct portion.

Furthermore, a large distance to a motor compartment in which a power plant such as a motor unit is disposed can be secured by providing the duct portion forward from the front end portion of the front side frame. Thus, for example, the heat exchange unit can be accommodated inside a bulkhead, and a larger motor compartment can be secured.

According to the aspect of (5), since the reinforcing ribs are formed in the duct portion, a center portion of the upper wall portion of the frame portion in the right and left direction can be reinforced by the reinforcing ribs.

According to the aspect of (6), the cooling performance of the heat exchanger can be improved by reducing the thickness of the frame portion toward the duct portion and enlarging the flow path. In addition, a weight of the frame portion (that is, the front end structure) can be reduced by reducing the thickness of the frame portion toward the duct portion. In this way, it is possible to achieve both improvement of the cooling performance of the heat exchanger and reduction in the weight of the front end structure by reducing the thickness of the frame portion toward the duct portion.

Here, the frame portion is a member which forms a framework of the front end structure and is a portion which is formed to have a greater thickness dimension than that of the duct portion and the like and has high strength and rigidity. Thus, even in a state in which the thickness of the frame portion is reduced toward the duct portion, the strength and rigidity of the frame portion are sufficiently ensured.

According to the aspect of (7), the duct portion is provided in the frame portion, and the partition portion is provided along the frame portion. Therefore, the side wall portion is reinforced by the duct portion and the partition portion. A bracket is connected to an upper end of the reinforced side wall portion and the upper member, and the hood lock is provided on the bracket. Thus, when the hood is opened and closed, due to a load applied to the hood lock, for example, a shearing force acts on a connection portion between the side wall portion and the bracket, and a downward load is input to the side wall portion.

Here, the side wall portion is reinforced by the duct portion and the partition portion. Therefore, the downward load input to the side wall portion can be supported by the side wall portion. Further, the side wall portion is connected to the front end portion of the front side frame via the vehicle body mounting portion. Therefore, the load input to the side wall portion can be dispersed to the front side frame via the vehicle body mounting portion. Further, the upper member is connected to the damper base, and the strength and rigidity are secured by the damper base. Thus, the load acting on the upper member from the bracket can be supported by the upper member. Accordingly, when the hood is opened and closed, the hood lock can be appropriately supported by the bracket.

DETAILED DESCRIPTION OF THE INVENTION

Hereinafter, an embodiment of the present invention will be described with reference to the drawings.

Figure 1:
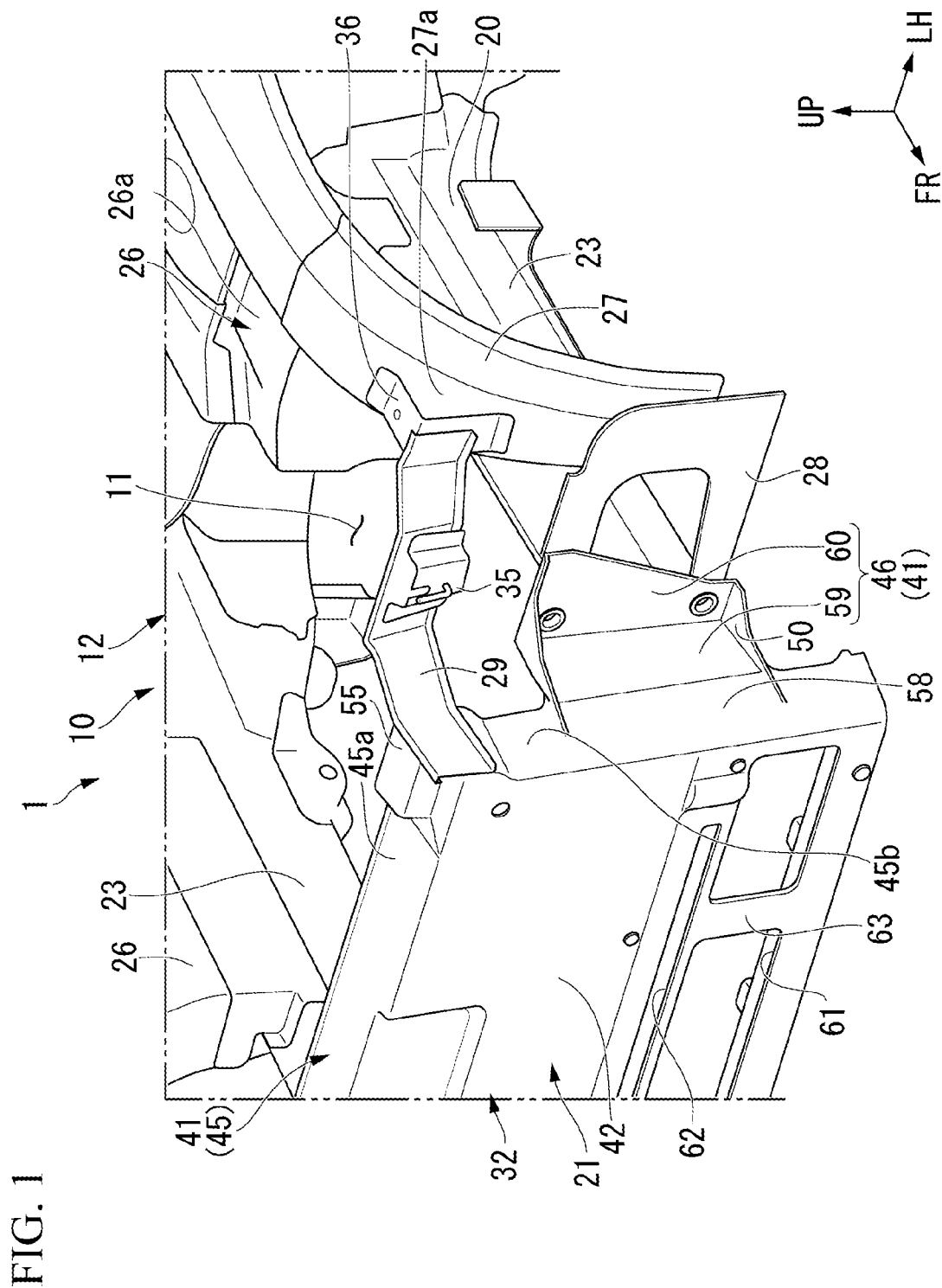
FIG. 1 is a perspective view showing a front portion of a vehicle body having a front end structure according to an embodiment of the present invention.
Figure 2:
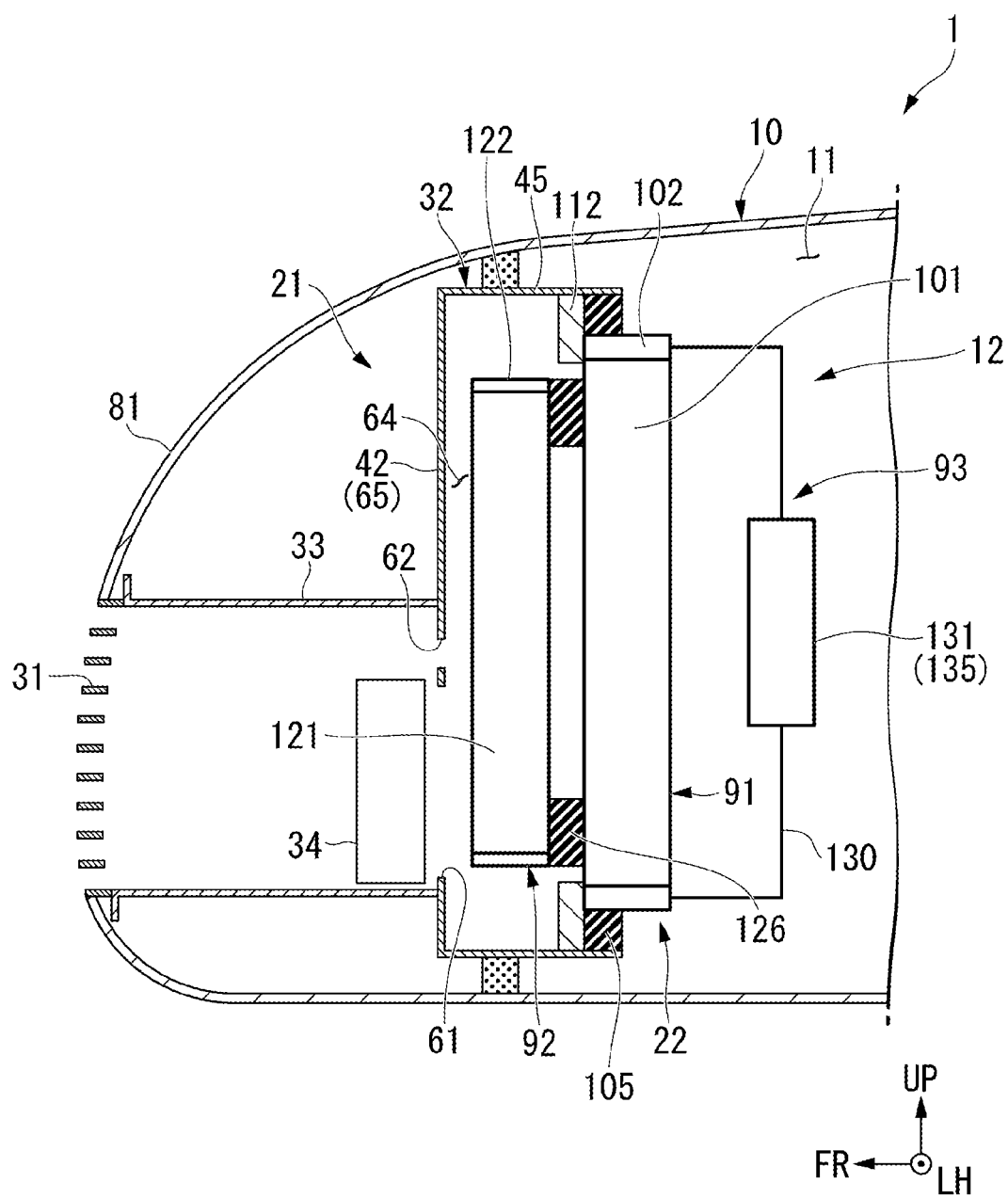
FIG. 2 is a schematic diagram showing the front portion of the vehicle body having the front end structure according to the embodiment.

FIG. 1 is a perspective view showing a front portion of a vehicle body 10. FIG. 2 is a schematic diagram showing the front portion of the vehicle 1. In the drawings used below, an arrow FR indicates the front of the vehicle 1, an arrow UP indicates the upper side of the vehicle 1, and an arrow LH indicates the left side of the vehicle 1.

The vehicle 1 shown in FIGS. 1 and 2 is an electric vehicle such as a hybrid vehicle or an electric vehicle, for example. The vehicle 1 includes a vehicle body front structure 12 which forms a motor compartment 11 and the like at a front portion of the vehicle body 10. The motor compartment 11 is partitioned from a vehicle compartment by a dashboard.

[Vehicle Body Front Structure]

The vehicle body front structure 12 includes a framework member 20, a front end structure 21, and a heat exchange unit 22.

<Framework Member>

As shown in FIG. 1, the framework member 20 includes a front side frame 23, a damper base 26, an upper member 27, a first bracket 28, a second bracket (a bracket) 29, and a bumper beam extension 24 (refer to FIG. 3) on both sides of the vehicle body 10. Further, the framework member 20 includes a hood lock 35 and a bumper beam 25 (refer to FIG. 5).

The front side frames 23 are provided on both sides of a lower portion of the motor compartment 11. Each of the front side frames 23 is formed in a rectangular shape in a cross-sectional view in a right and left direction and extends in a forward and rearward direction of the vehicle body. Rear end portions of both front side frames 23 are connected to a frame member (not shown) such as a floor frame or a side sill.

Further, a front sub-frame (not shown) is provided below the front side frames 23. The front sub-frame is formed in a grid shape (a frame shape) in a plan view. The front sub-frame is disposed to cover the motor compartment 11 from below. For example, both ends of the front sub-frame in the right and left direction are connected to the corresponding front side frame 23. The front sub-frame supports a power plant such as a motor unit via a mount member or the like.

The damper base 26 is provided upright at the rear portion of the front side frame 23. A top portion 26a of the damper base 26 supports an upper end portion of a damper (not shown) of a front wheel. The upper members 27 are connected to portions of the top portion 26a of the damper base 26 on the outer side in the right and left direction. The upper members 27 are disposed on both sides of the motor compartment 11. Each of the upper members 27 is formed to have a rectangular shape in a cross-sectional view in the right and left direction. The upper member 27 extends in a curved shape downward and forward to a position in a front end portion of the front side frame 23. The first bracket 28 straddles between the front end portion of the front side frame 23 and a lower end portion (a front end portion) of the upper member 27.

A support bracket 36 is connected to a curved portion 27a of the upper member 27, and an outer end portion of the second bracket 29 is connected to the support bracket 36. That is, the outer end portion of the second bracket 29 is connected to the curved portion 27a of the upper member 27 via the support bracket 36. An inner end portion of the second bracket 29 is coupled to an upper end of a side wall portion 45b of a frame portion 45 which will be described later. In this state, the second bracket 29 straddles substantially horizontally between the curved portion 27a of the upper member 27 and the upper end of the side wall portion 45b.

The hood lock 35 is provided at a center of the second bracket 29 in the right and left direction. The hood lock 35 is a member which fixes a hood (a bonnet) to the vehicle body (that is, the second bracket 29) by locking a latch to a striker of the hood when the hood is closed.

Figure 3:
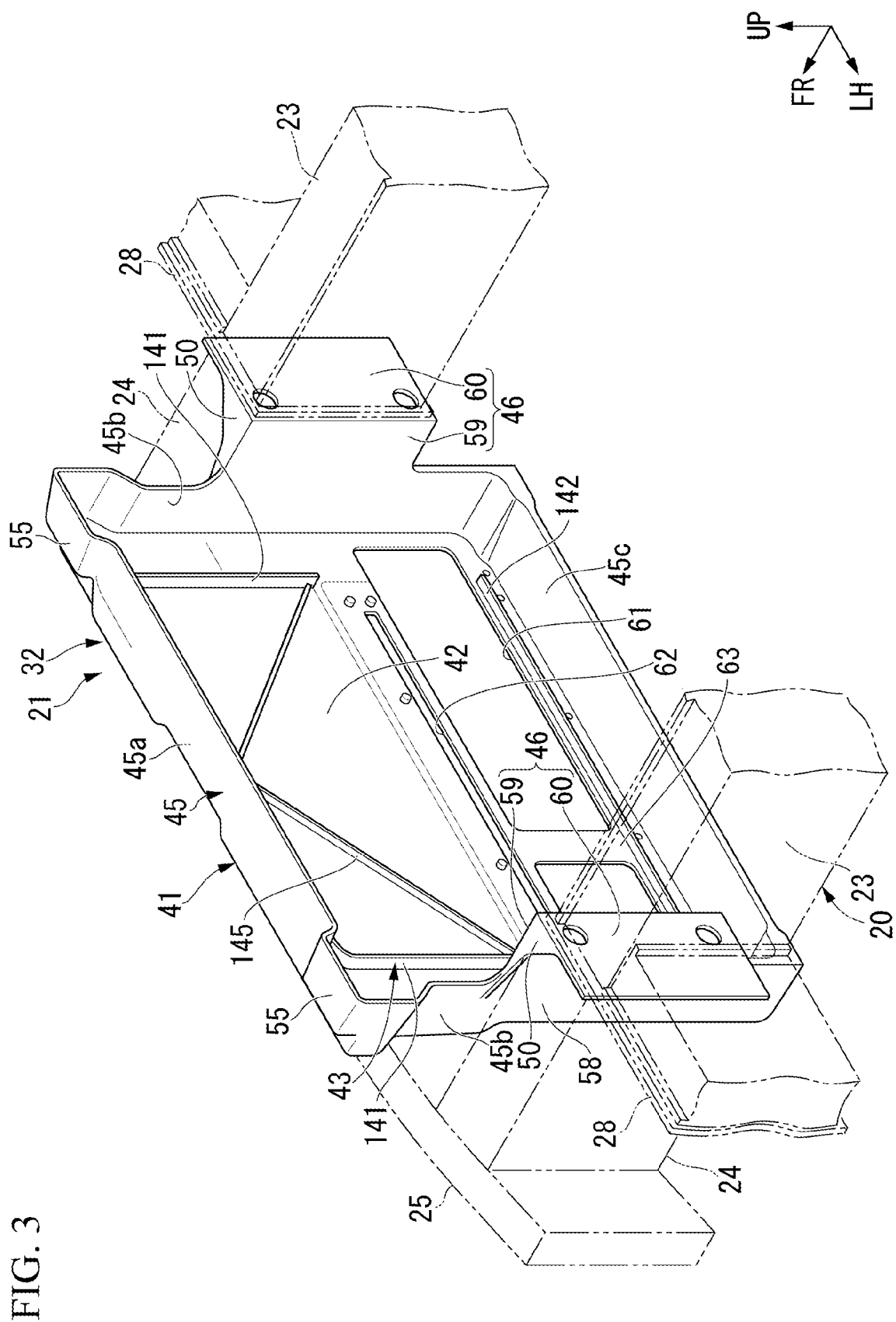
FIG. 3 is a perspective view of the front end structure of the embodiment when seen from the rear.

FIG. 3 is a perspective view of the front end structure 21 when seen from the rear.

As shown in FIGS. 1 and 3, the bumper beam extension 24 is connected to a front end portion of the front side frame 23 via the bulkhead 32 and an inner end portion of the first bracket 28 which will be described later. The bumper beam extension 24 is a member having a closed cross-sectional structure which is rectangular in a cross-section view. The bumper beam extension 24 is constituted to be compressively deformable (buckling-deformable) in the forward and rearward direction when an impact load is input.

The bumper beam 25 (also refer to FIG. 5) straddles between front end portions of both bumper beam extensions 24. The bumper beam 25 is disposed at a position which covers an upper portion of a duct portion 42, which will be described later, from the front.

<Front End Structure>

As shown in FIG. 2, the front end structure 21 is disposed in front of the heat exchange unit 22 in the motor compartment 11. The front end structure 21 supports the heat exchange unit 22 and guides external air introduced into the motor compartment 11 through a grille 31 to the heat exchange unit 22. The front end structure 21 includes the bulkhead 32, a bumper duct 33, and a shutter 34.

Figure 4:
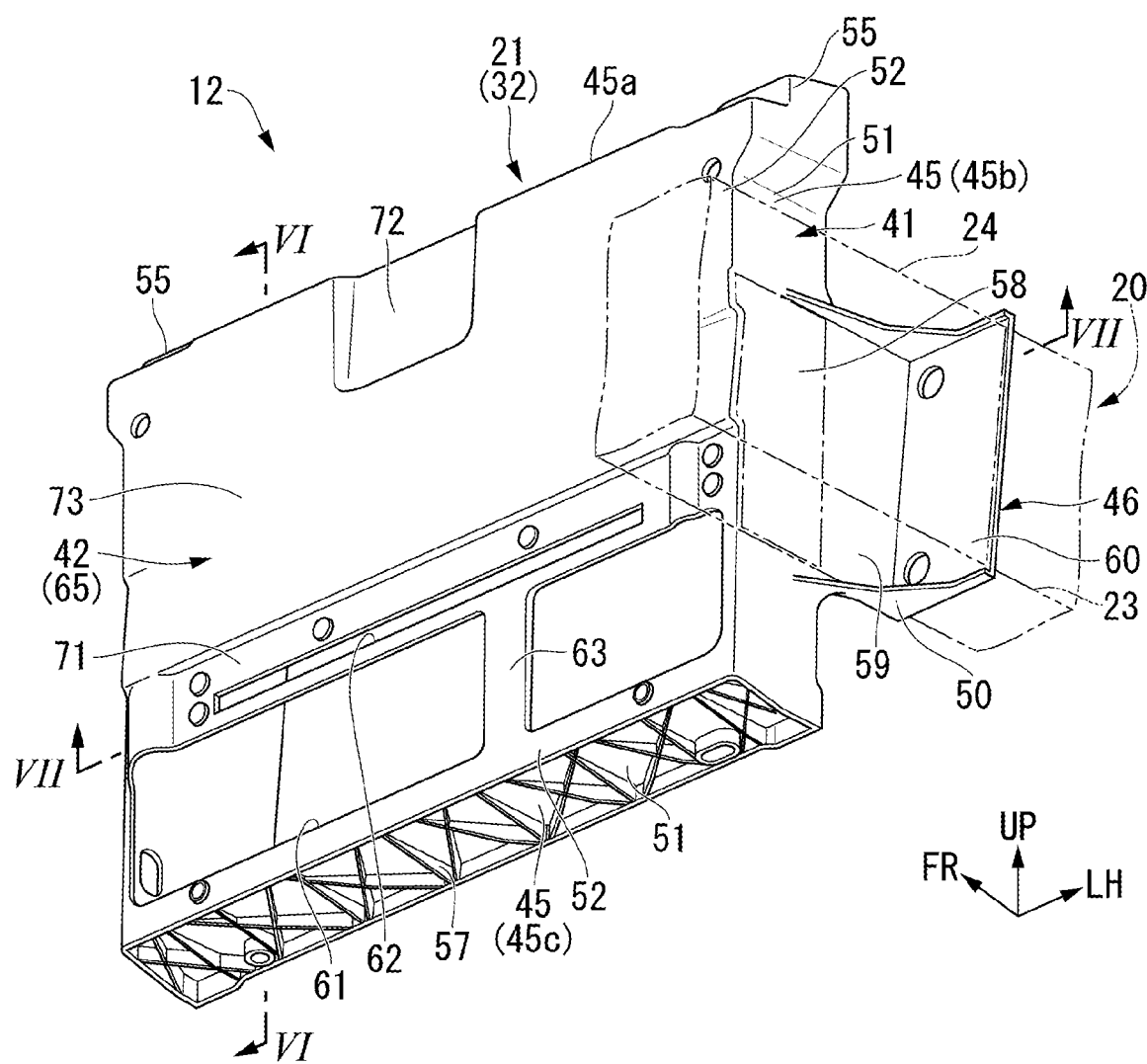
FIG. 4 is a perspective view of the front end structure of the embodiment when seen from the front.
Figure 5:
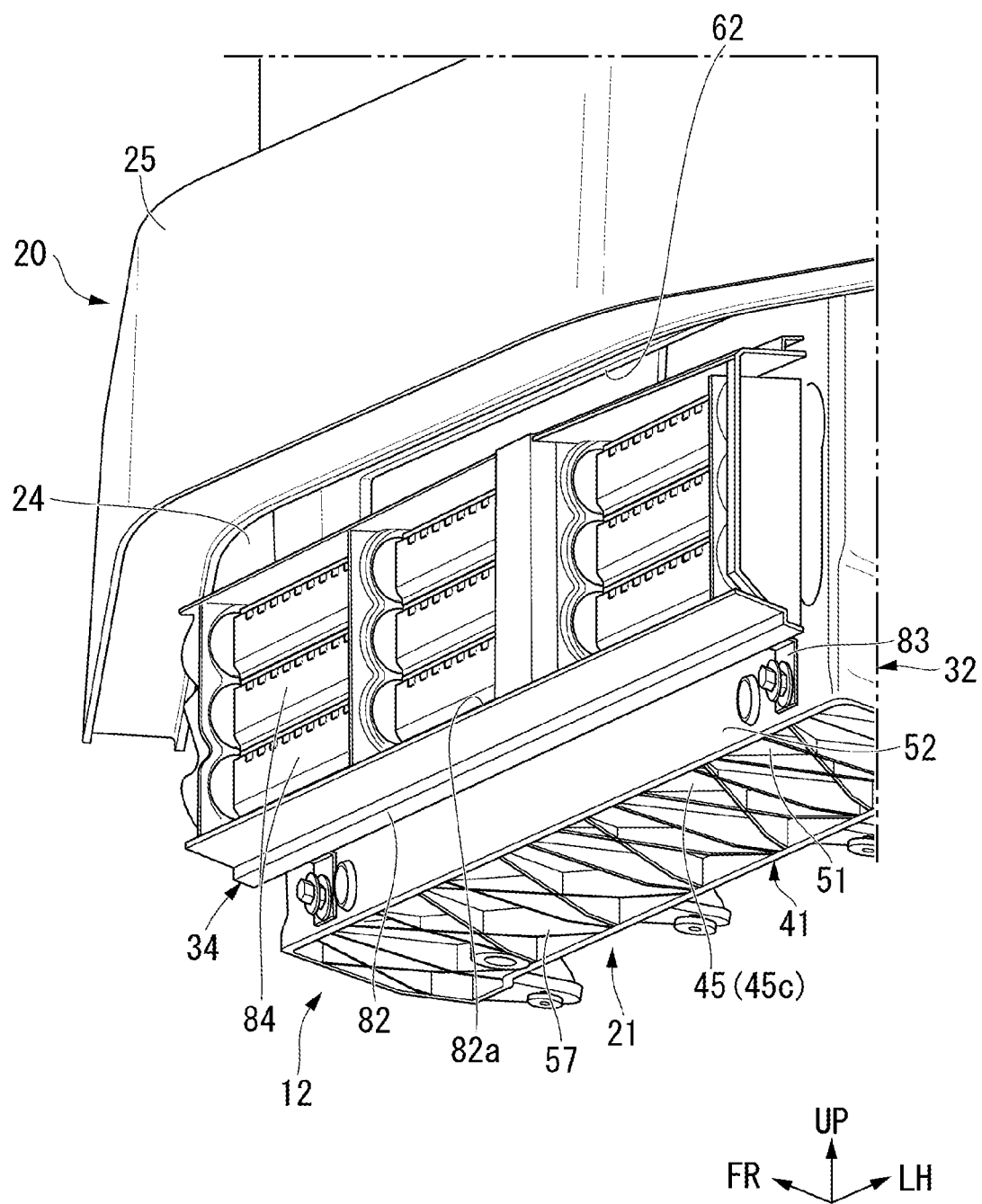
FIG. 5 is a perspective view of a lower portion of the front end structure of the embodiment when seen from the front.

FIG. 4 is a perspective view of the front end structure 21 when seen from the front. FIG. 5 is a perspective view of a lower portion of the front end structure 21 when seen from the front.

As shown in FIGS. 3 to 5, the bulkhead 32 has a rectangular shape in a front view and is formed in a box shape which opens rearward. The bulkhead 32 covers an outer peripheral portion of the heat exchange unit 22 by covering the heat exchange unit 22 (refer to FIG. 6) from the front. In the embodiment, the bulkhead 32 is integrally formed of a resin material or the like. The bulkhead 32 is integrally formed by injection molding, for example, a polypropylene resin containing reinforcing fibers (for example, glass fibers). However, when a required strength of the bulkhead 32 is low, it is not necessary to include the reinforcing fibers. On the other hand, when the required strength of the bulkhead 32 is high, the bulkhead 32 may be formed by heating and pressing resin sheets while a resin sheet containing discontinuous fibers (long fibers or short fibers) is superimposed on a resin sheet containing continuous fibers.

Figure 6:
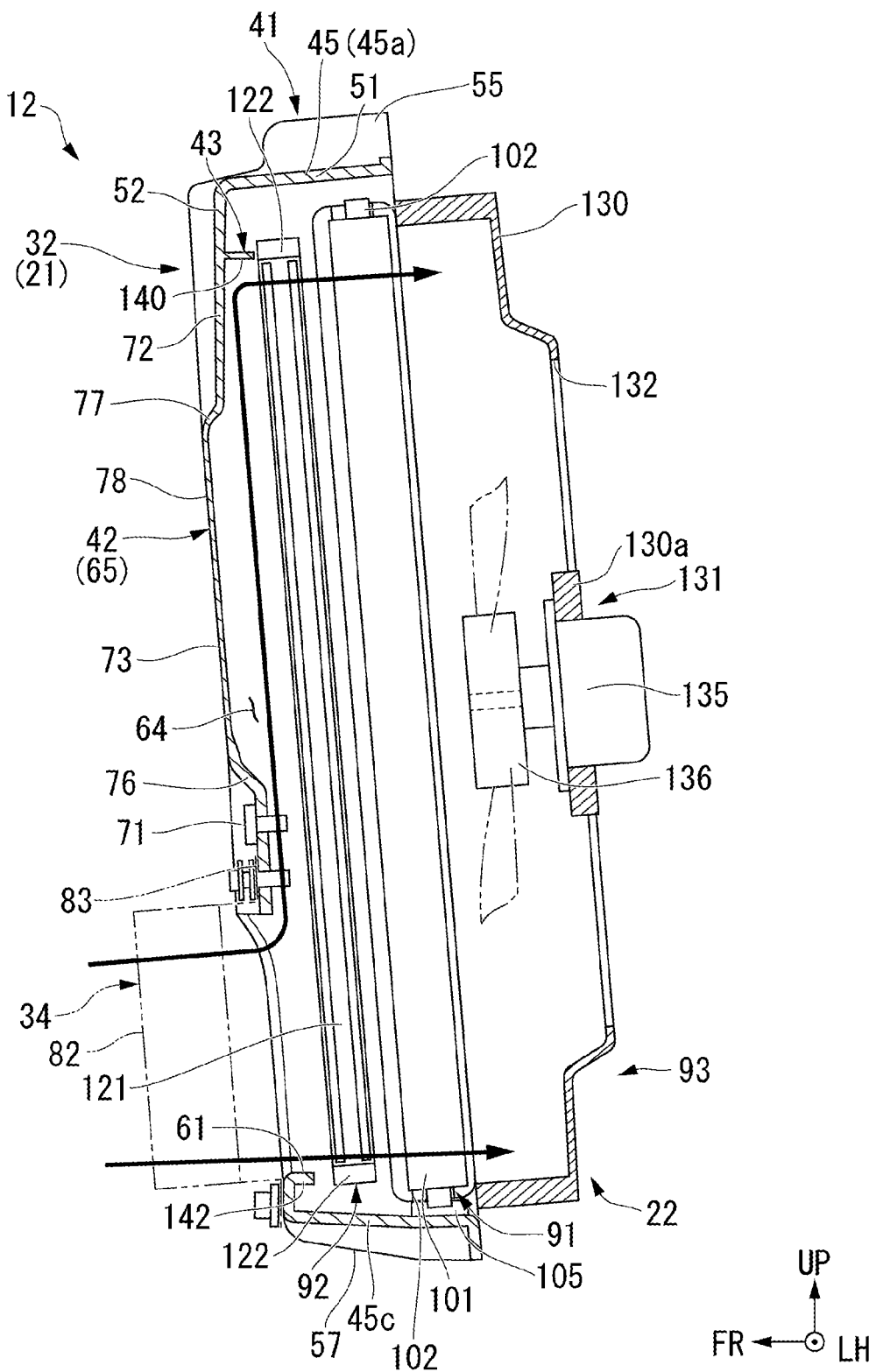
FIG. 6 is a sectional view taken along line VI-VI in FIG. 4.
Figure 7:
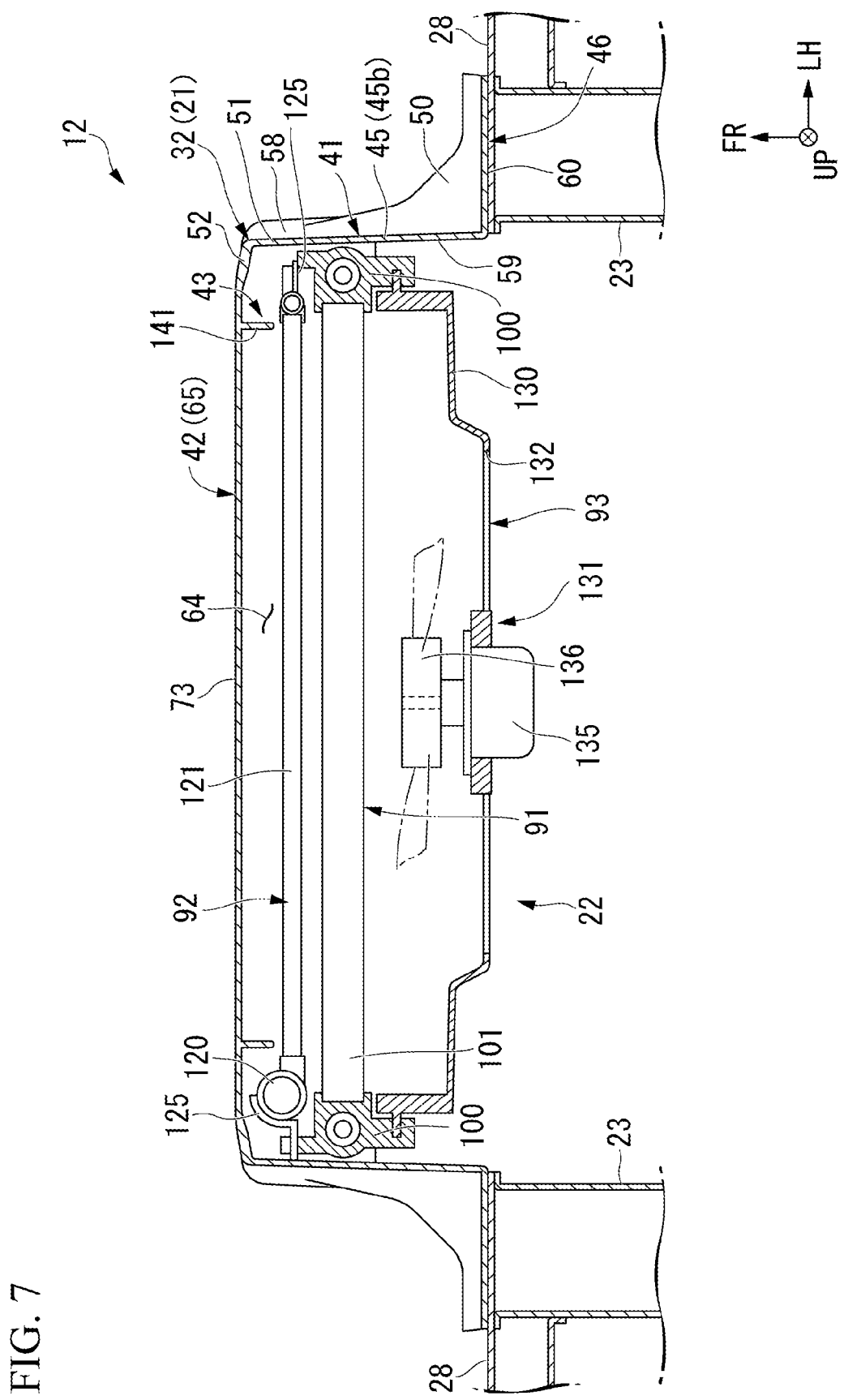
FIG. 7 is a sectional view taken along line VII-VII in FIG. 4.

FIG. 6 is a cross-sectional view taken along line VI-VI in FIG. 4. FIG. 7 is a cross-sectional view taken along line VII-VII in FIG. 4.

As shown in FIGS. 6 and 7, the bulkhead 32 includes a frame portion unit 41, a duct portion 42, and a partition portion 43.

As shown in FIGS. 3 and 4, the frame portion unit 41 includes the frame portion 45 and a vehicle body mounting portion (a support part) 46. The frame portion 45, the vehicle body mounting portion 46, the duct portion 42, and the partition portion 43 are integrally formed by injection molding, for example, a polypropylene resin.

The frame portion 45 is a frame portion which constitutes an outer periphery of the bulkhead 32. The frame portion 45 is formed by an upper wall portion 45a, side wall portions 45b on both sides, and a lower wall portion 45c. An outer peripheral portion of a radiator 91 and an outer peripheral portion of a condenser 92 which will be described later are covered by the frame portion 45.

The frame portion 45 is formed in an L-shape (refer to FIGS. 10 and 11) in a cross-sectional view. Specifically, the frame portion 45 includes a horizontal wall 51 which extends in the forward and rearward direction, and a vertical wall 52 which is bent inward from a front end portion of the horizontal wall 51.

A bulging portion 55 is formed at rear end portions of upper corner portions of the frame portion 45 (the bulkhead 32). The bulging portion 55 bulges upward with respect to the upper wall portion 45a of the frame portion 45 and bulges outward with respect to the side wall portion 45b in the right and left direction.

As shown in FIG. 5, a reinforcing rib 57 is formed on the lower wall portion 45c of the frame portion 45 (the bulkhead 32). The reinforcing rib 57 protrudes downward from the horizontal wall 51 portion of the lower wall portion 45c. The reinforcing rib 57 is formed, for example, in a lattice shape or a straight line shape. In the embodiment, a bulging amount of the reinforcing rib 57 which bulges from the horizontal wall 51 increases from the front toward the rear. However, the shape, the height, and the like of the reinforcing rib 57 can be appropriately changed.

As shown in FIGS. 3 and 7, a concave portion 58 which is recessed inward in the right and left direction is formed at a center portion of the side wall portion 45b in a vertical direction. The concave portion 58 is a portion formed to be thinner than both end portions of the side wall portion 45b in the vertical direction and is formed over the entire side wall portion 45b in the forward and rearward direction. A part of the above-described bumper beam extension 24 is accommodated in the concave portion 58. The bumper beam extension 24 passes through the concave portion 58 in the forward and rearward direction.

The vehicle body mounting portion 46 is continuous with a position in the side wall portion 45b (the horizontal wall 51 portion) corresponding to the concave portion 58 in the vertical direction. The vehicle body mounting portion 46 is formed in an L shape in a plan view. The vehicle body mounting portion 46 includes a rear extending portion 59 which extends rearward from the side wall portion 45b, and a flange portion 60 which is bent outward from the rear extending portion 59 in the right and left direction.

The flange portion 60 is connected to the front end portion of the front side frame 23 via the first bracket 28. Further, the flange portion 60 is connected to a rear end portion of the bumper beam extension 24. Thus, the flange portion 60 is sandwiched by the front end portion of the front side frame 23 and the rear end portion of the bumper beam extension 24 in the forward and rearward direction. That is, the front side frame 23 and the bumper beam extension 24 are connected to each other via the flange portion 60 and the first bracket 28. The horizontal wall 51 portions of the upper wall portion 45a and the lower wall portion 45c may also be appropriately fixed to the framework member 20.

In the embodiment, a support rib 50 is provided on an outer peripheral edge (upper and lower edges) of the vehicle body mounting portion 46. The support rib 50 is formed over a portion which extends from the flange portion 60 to upper and lower edges of the concave portion 58 via the rear extending portion 59. In the embodiment, a protruding amount of the support rib 50 increases toward a boundary portion between the flange portion 60 and the rear extending portion 59.

As shown in FIGS. 4 and 7, the duct portion 42 is continuous with an inner peripheral edge (a front end) of the frame portion 45 and forms a front wall portion of the bulkhead 32 together with the vertical wall 52 portion. An upper portion of the duct portion 42 is covered from the front with the bumper beam 25 (refer to FIG. 5). A first introduction port (an introduction port) 61 and a second introduction port (an introduction port) 62 are formed in a lower portion (a portion located below the center) of the duct portion 42. Each of the introduction ports 61 and 62 passes through the duct portion 42 in the forward and rearward direction and allows the inside and the outside of the bulkhead 32 to communicate with each other.

The first introduction port 61 is a rectangular through hole which extends in the right and left direction at a lower end portion of the duct portion 42. In the embodiment, the first introduction port 61 is divided in the right and left direction by a dividing portion 63.

The second introduction port 62 is located above the first introduction port 61 in the duct portion 42. The second introduction port 62 is formed in an elongated shape having a smaller width in the vertical direction and a shorter length in the right and left direction than those of the first introduction port 61. However, shapes and the like of the introduction ports 61 and 62 can be changed as appropriate. Further, the number of introduction ports may be one.

As shown in FIGS. 4 and 6, a portion of the duct portion 42 located above the second introduction port 62 constitutes a flow path wall 65. In other words, the first introduction port 61 and the second introduction port 62 are adjacent to the lower side of the flow path wall 65. A lower end portion of the flow path wall 65 is located above the lower support rib 50 of the vehicle body mounting portion 46. On the other hand, an upper end portion of the flow path wall 65 is located above the upper support rib 50 of the vehicle body mounting portion 46. That is, at least a part of the duct portion 42 protrudes above the vehicle body mounting portion 46. In addition, the flow path wall 65 is disposed with an interval therefrom in front of the condenser 92 of the heat exchange unit 22 which will be described later. The flow path wall 65 defines (forms) a flow path 64 which is vertically continuous between the flow path wall 65 and the condenser 92 of the heat exchange unit 22 which will be described later. The first introduction port 61 and the second introduction port 62 communicate with a lower end portion of the flow path 64.

That is, the flow path wall 65 allows the external air introduced into the bulkhead 32 through the introduction ports 61 and 62 to flow upward and right and left along a front surface of the condenser 92. In a longitudinal cross-sectional view in the vertical direction, the flow path wall 65 includes a lower flow path wall 71, an upper flow path wall 72, and a central flow path wall 73 located between the lower flow path wall 71 and the upper flow path wall 72.

The lower flow path wall 71 extends obliquely forward as it goes upward. That is, a cross-sectional area (a cross-sectional area perpendicular to the vertical direction) of the flow path 64 increases as it becomes spaced further upward from the introduction ports 61 and 62.

The upper flow path wall 72 extends obliquely rearward as it goes upward. That is, the cross-sectional area (the cross-sectional area orthogonal to the vertical direction) of the flow path 64 decreases as it goes upward. However, the lower flow path wall 71 and the upper flow path wall 72 may extend parallel to the vertical direction.

The central flow path wall 73 includes tapered portions (a lower tapered portion (a reduced portion) 76 and an upper tapered portion (a reduced portion) 77) which are located at both upper and lower end portions, and a straight portion (an enlarged portion) 78 located between the tapered portions 76 and 77.

The lower tapered portion 76 extends forward from an upper end edge of the lower flow path wall 71 toward the upper side. An angle of the lower tapered portion 76 (an angle formed with respect to the vertical direction) is larger than that of the lower flow path wall 71.

The upper tapered portion 77 extends forward from a lower end edge of the upper flow path wall 72 toward the lower side. An angle of the upper tapered portion 77 (an angle formed with respect to the vertical direction) is larger than that of the upper flow path wall 72.

The straight portion 78 connects a space between an upper end edge of the lower tapered portion 76 and a lower end edge of the upper tapered portion 77. The flow path 64 of the embodiment has a maximum flow path cross-sectional area in the straight portion 78.

As shown in FIG. 2, the bumper duct 33 connects a space between the first introduction port 61 and the grille 31. The bumper duct 33 is formed in a rectangular tube shape which surrounds the entire first introduction port 61 and second introduction port 62. A rear end portion of the bumper duct 33 is fixed to a portion of the duct portion 42 which is located around the introduction ports 61 and 62.

In the embodiment, as shown in FIGS. 2 and 6, in the duct portion 42, a thickness of peripheral portions of the introduction ports 61 and 62 on which the rear end portion of the bumper duct 33 is mounted is thicker than the other portions. Specifically, the thickness of the peripheral portions of the introduction ports 61 and 62 is equal to that of the frame portion 45.

On the other hand, the front end portion of the bumper duct 33 is connected to an exterior part of the vehicle body 10 (for example, a bumper face 81 and the grille 31). In the embodiment, a front end opening portion of the bumper duct 33 opens forward through the grille 31.

The shutter 34 is provided in a portion of a rear end portion in the bumper duct 33 which overlaps the first introduction port 61 in a front view. That is, the shutter 34 and the second introduction port 62 are provided not to overlap each other in a front view. The shutter 34 switches between communication and blocking between the inside of the bumper duct 33 and the inside of the bulkhead 32 through the first introduction port 61.

As shown in FIGS. 5 and 6, the shutter 34 includes a shutter frame 82, a mounting piece 83, and a flap 84.

The shutter frame 82 is formed in a frame shape having the same size as the first introduction port 61 in a front view. The inside of the shutter frame 82 constitutes an air outlet 82a. A plurality of air outlets 82a are arranged and formed, for example, in the right and left direction.

The mounting piece 83 connects a space between the shutter frame 82 and the duct portion 42. A plurality of mounting pieces 83 are provided in the upper frame portion and the lower frame portion of the shutter frame 82, for example, at intervals in the right and left direction. The mounting pieces 83 protrude rearward from the upper frame portion and the lower frame portion. The mounting pieces 83 are fastened to a portion (the vertical wall 52 portion of the lower wall portion 45c or the duct portion 42) of the duct portion 42 which is located around the first introduction port 61 by a bolt or the like. Therefore, the shutter 34 is fixed to the bulkhead 32 with a gap between a rear end edge of the shutter frame 82 and a front surface of the duct portion 42 in the forward and rearward direction (refer to also FIG. 2). The shutter frame 82 of the embodiment is constituted to be bending deformable in the forward and rearward direction with the mounting piece 83 as a starting point in a gap between the shutter frame 82 and the duct portion 42.

The flap 84 is constituted to open and close the air outlet 82a. The flap 84 is supported by the shutter frame 82 to be rotatable around an axis in the right and left direction. In the shutter 34, an opening degree of the air outlet 82a is adjusted by adjusting a rotation position of the flap 84. In this case, the flap 84 closes the air outlet 82a at a fully closed position. In the shutter 34 of the embodiment, a plurality of flaps 84 are disposed with respect to one air outlet 82a in a vertical direction. The front end structure 21 need not have the shutter 34.

As shown in FIGS. 1 and 7, the duct portion 42 is formed at a front end of the frame portion 45. Thus, due to the duct portion 42, the strength of the frame portion 45 can be increased, and the rigidity of the frame portion 45 can be secured. Further, an upper end portion of the duct portion 42 is disposed above the vehicle body mounting portion 46, and the vehicle body mounting portion 46 is connected to the front end portion of the front side frame 23 via the second bracket 29. Therefore, the duct portion 42 is provided at the front end portions of the right and left front side frames 23 via the vehicle body mounting portion 46 and the second bracket 29. Thus, for example, when a load in vertically opposite directions is applied to the front end portions of both the right and left front side frames 23 due to vibration of the power plant or vibration of traveling, vibration on the front ends of both the right and left front side frames 23 or the frame portion 45 in the vertically opposite directions can be curbed by the duct portion 42.

Further, the duct portion 42 is located forward from the vehicle body mounting portion 46. The reason why the duct portion 42 is disposed forward from the vehicle body mounting portion 46 is as follows.

That is, the vibrations in the vertical direction are transmitted from the right and left front side frames 23 to the vehicle body mounting portion 46, and, for example, the transmitted vibrations in the vertical direction act on the right and left side wall portions 45b of the frame portion 45. Here, the vehicle body mounting portion 46 is connected to the front end portion of the front side frame 23 via the first bracket 28. Therefore, the duct portion 42 can be disposed forward from the front end portion of the front side frame 23. Thus, the vibrations acting on the right and left side wall portions 45b can be curbed over the entire (the entire surface) of the duct portion 42.

Furthermore, for example, a large distance to the motor compartment 11 in which the power plant such as a motor unit is disposed can be secured by providing the duct portion 42 forward from the front end portion of the front side frame 23. Thus, for example, the heat exchange unit 22 can be accommodated inside the bulkhead 32, and the motor compartment 11 can be secured to be larger.

<Heat Exchange Unit>

As shown in FIG. 2, the heat exchange unit 22 includes a radiator (a heat exchanger) 91, a condenser (a heat exchanger) 92, and a fan 93.

The radiator 91 is to cool a motor which is a power source of the vehicle 1, a power control unit (PCU), and the like. As shown in FIGS. 2 and 7, the radiator 91 includes, for example, radiator tanks (outer peripheral areas) 100 located on both right and left sides, a radiator core (a heat exchange area) 101 which straddles between the radiator tanks 100, and frame members (outer peripheral areas) 102 which straddle between radiator tanks 100 on both upper and lower sides of radiator core 101.

A refrigerant pipe is connected to each of the radiator tanks 100. The refrigerant pipe is connected to the above-described motor, PCU, or the like via a pump.

The radiator core 101 includes heat exchange tubes which connect the radiator tanks 100 in parallel, and fins which connect the adjacent heat exchange tubes. The radiator 91 cools refrigerant by performing heat exchange between the heat exchange tubes and the fins when the external air passes between the adjacent heat exchange tubes in the forward and rearward direction. That is, the radiator core 101 forms a heat exchange area in the radiator 91.

The radiator 91 of the embodiment is disposed inside the bulkhead 32. As shown in FIG. 6, lowers end portions of the radiator tanks 100 are supported by the horizontal wall 51 portion of the lower wall portion 45*c* via an elastically deformable lower radiator mount 105.

Figure 8:
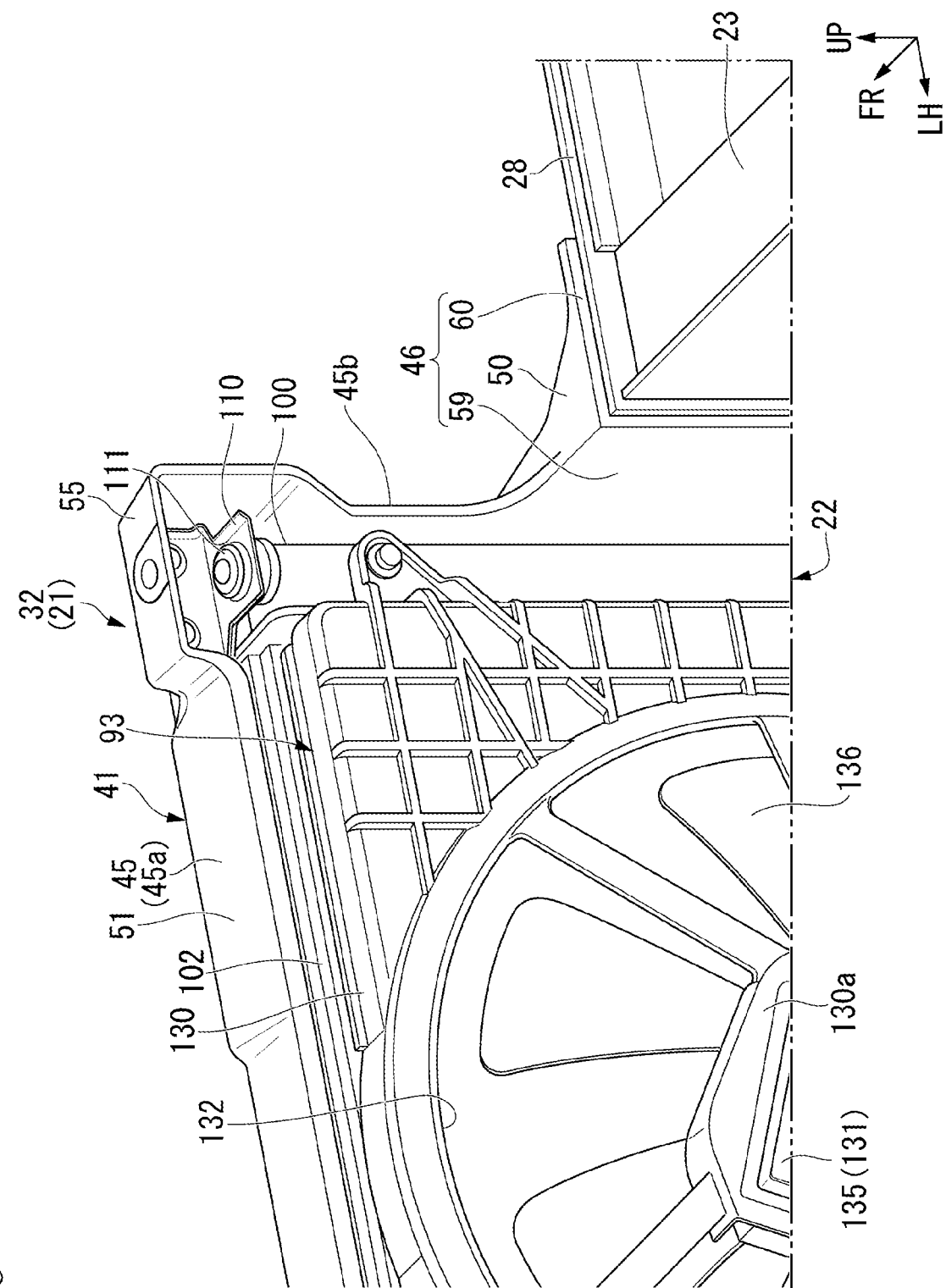
FIG. 8 is a perspective view of a heat exchange unit of the embodiment when seen from the rear.

FIG. 8 is a perspective view of the heat exchange unit 22 when seen from the rear.

As shown in FIG. 8, an upper end of the radiator tank 100 is mounted on the frame portion 45 via a radiator bracket 110. The radiator bracket 110 is formed in an L shape in a side view. The radiator bracket 110 is accommodated in the bulging portion 55. A rear end portion of the radiator bracket 110 is mounted on the upper end portion of the radiator tank 100 via an elastically deformable upper radiator mount 111. A front end portion of the radiator bracket 110 is fixed to a front wall portion of the bulging portion 55 by a bolt or the like in the forward and rearward direction. The frame portion 45 may have a constitution in which the radiator bracket 110 is fixed to the bulging portion 55 in the vertical direction, or may have a constitution without the bulging portion 55.

As shown in FIG. 2, a portion (the radiator tank 100 and the frame member 102) of radiator 91 located outside the radiator core 101 is in close contact with the frame portion 45 via a seal member 112. In this state, an outer peripheral portion of the radiator core 101 is covered by the frame portion 45.

The condenser 92 constitutes a refrigeration cycle of an air conditioner together with a compressor, an evaporator and the like (neither is shown). The condenser 92 is disposed in front of the radiator 91 inside the bulkhead 32. The condenser 92 has an external shape smaller than that of the radiator 91 in a front view.

As shown in FIGS. 2 and 7, the condenser 92 includes, for example, condenser tanks (outer peripheral area) 120 located on both right and left sides, a condenser core (a heat exchange area) 121 which straddles between the condenser tanks 120, and frame members 122 which straddle between the condenser tanks 120 on both upper and lower sides of the condenser core 121.

As shown in FIG. 7, the condenser tank 120 is connected to the corresponding radiator tank 100 via a condenser bracket 125. As shown in FIGS. 2 and 7, the condenser tanks 120 are supported by the condenser bracket 125 via a condenser mount 126. The condenser mount 126 is formed of a resin material or the like to be elastically deformable.

The condenser core 121 includes heat exchange tubes which connect the condenser tanks 120 in parallel, and fins which connect the adjacent heat exchange tubes. The condenser 92 cools the refrigerant by performing heat exchange between the heat exchange tubes and the fins when the external air passes between the adjacent heat exchange tubes in the forward and rearward direction. That is, the condenser core 121 forms a heat exchange area in the condenser 92.

As shown in FIGS. 6 to 8, the fan 93 includes a shroud 130 and a fan motor 131.

The shroud 130 covers the radiator core 101 from the rear. An air guide hole 132 which passes through the shroud 130 in the forward and rearward direction is formed in the shroud 130.

The fan motor 131 is provided inside the air guide hole 132. Specifically, the fan motor 131 includes a motor 135 and a fan main body 136. The motor 135 is supported by a hub portion 130*a* (refer to FIG. 8) provided inside the air guide hole 132. The fan main body 136 is fixed to an output shaft of the motor 135.

Figure 9:
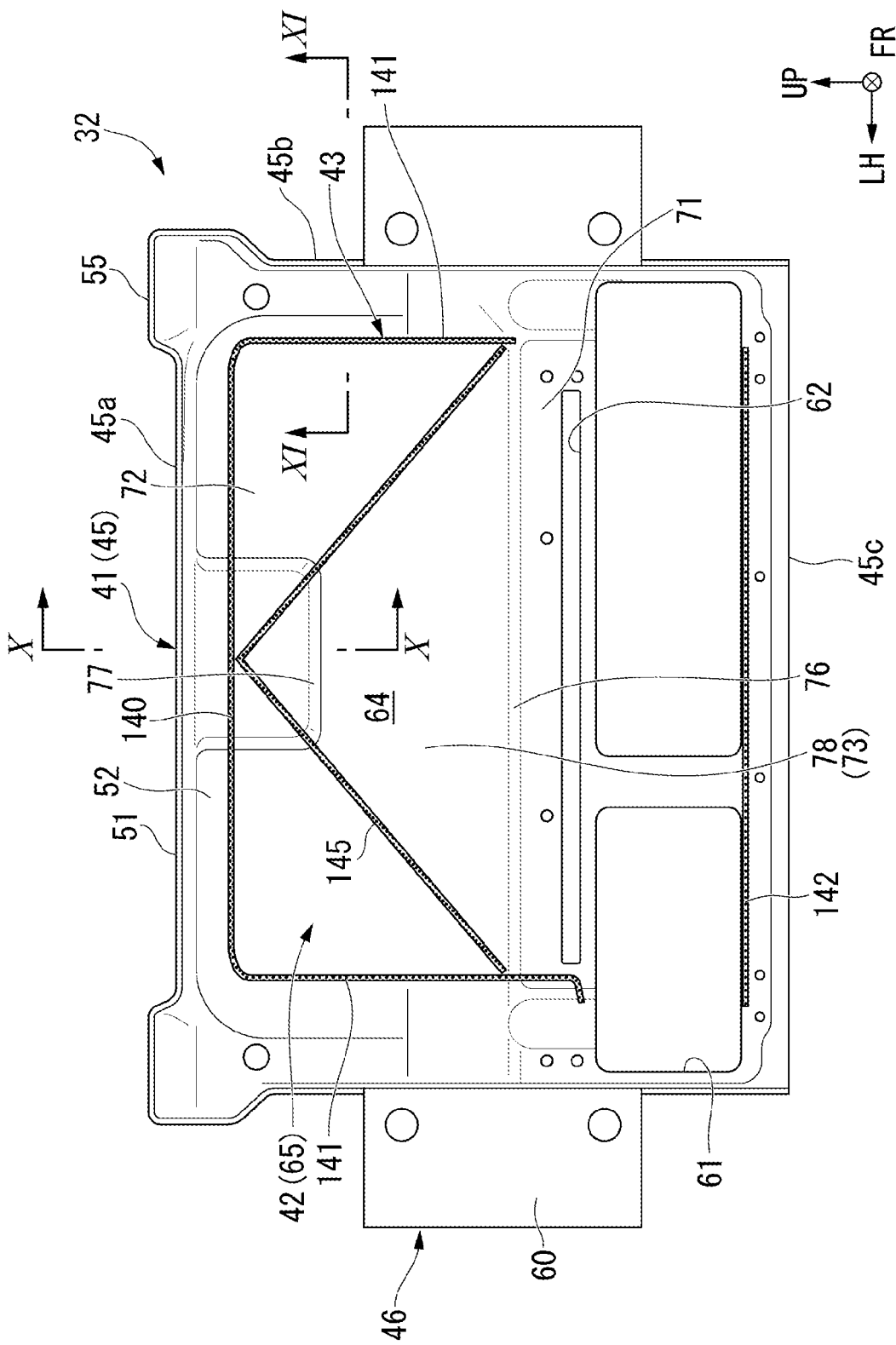
FIG. 9 is a rear view of a bulkhead of the embodiment.

FIG. 9 is a rear view of the bulkhead 32.

Here, as shown in FIG. 6, FIG. 7, and FIG. 9, in the bulkhead 32 of the embodiment, the partition portion 43 is formed in the frame portion 45 and the duct portion 42. The partition portion 43 is located in the above-described condenser core 121 and on the outer peripheral side of the condenser core 121. In other words, the partition portion 43 is formed at a portion which overlaps an outer peripheral edge of the condenser core 121 (a boundary portion between the condenser tank 120 and the frame member 122) in a front view.

The partition portion 43 extends, for example, in a rib shape which surrounds the periphery of the condenser core 121 along the horizontal wall 51 and protrudes rearward. Specifically, the partition portion 43 includes an upper rib 140, a side rib 141, and a lower rib 142.

Figure 10:
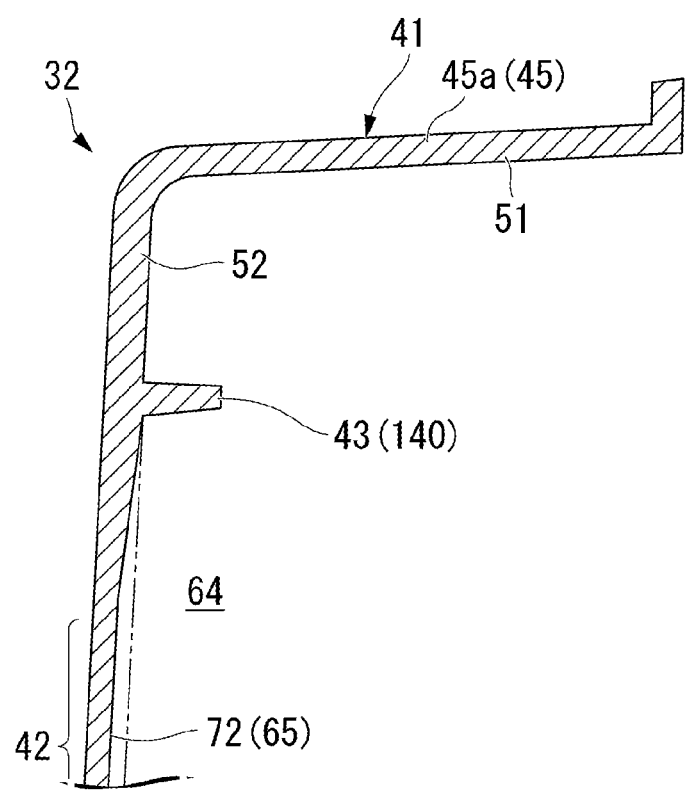
FIG. 10 is a sectional view taken along line X-X in FIG. 9.
Figure 10:
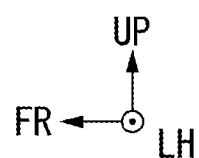

FIG. 10 is a cross-sectional view taken along line X-X of FIG. 9.

As shown in FIG. 10, the upper rib 140 protrudes rearward from the longitudinal wall 52 portion of the upper wall portion 45*a* and extends in the right and left direction. A tip end portion (a rear end portion) of the upper rib 140 approaches or is in contact with an outer peripheral edge of the condenser core 121 from the front.

Figure 11:
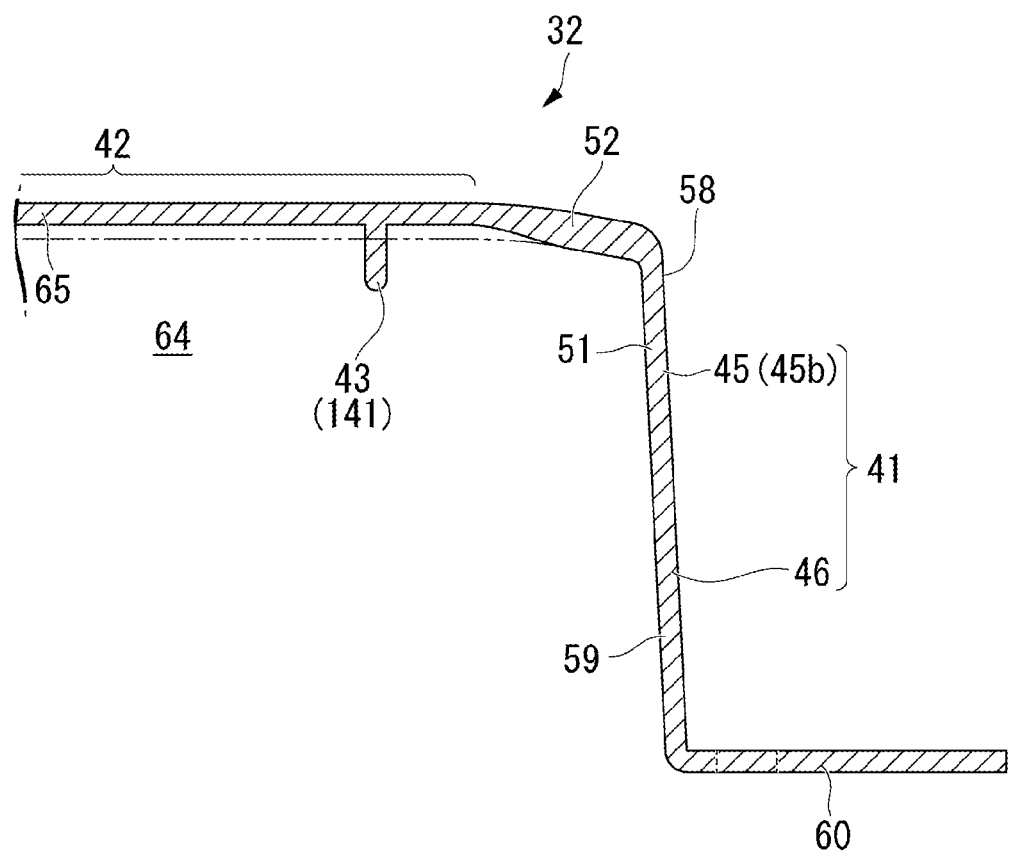
FIG. 11 is a sectional view taken along line XI-XI in FIG. 9.
Figure 11:
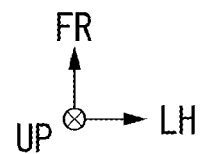

FIG. 11 is a cross-sectional view taken along line XI-XI in FIG. 9.

As shown in FIGS. 9 and 11, the side ribs 141 extend downward from both right and left ends of the upper rib 140. The side ribs 141 protrude rearward from an outer peripheral edge of the duct portion 42. A tip end portion (a rear end portion) of each of the side ribs 141 approaches or is in contact with the outer peripheral edge of the condenser core 121 from the front. A lower end edge of the side rib 141 terminates above the second introduction port 62. The upper rib 140 and the side ribs 141 surround at least the upper side and the right and left sides of the above-described central flow path wall 73.

As shown in FIG. 9, the lower rib 142 is formed in a portion of the longitudinal wall 52 portion of the lower wall portion 45*c* which is located below the first introduction port 61. The lower rib 142 protrudes rearward from the longitudinal wall 52 portion of the lower wall portion 45*c* and extends in the right and left direction. A tip end portion (a rear end portion) of the lower rib 142 approaches or is in contact with the outer peripheral edge of the condenser core 121 from the front. Each of the ribs 140 to 142 is not limited to a constitution in which it extends continuously and may be a constitution in which it extends intermittently.

A reinforcing rib 145 is provided on the duct portion 42. The reinforcing rib 145 extends in a forked shape. Specifically, the reinforcing rib 145 extends outward in the right and left direction as it goes downward from the center portion (specifically, a center of the upper rib 140 in the right and left direction) of the upper flow path wall 72 (a portion of the duct portion 42 near the upper wall portion 45*a*) in the right and left direction.

The reinforcing rib 145 preferably has a rearward protruding height, for example, which is smaller than a protruding amount of the partition portion 43 not to affect a flow of the external air in the flow path 64.

It is possible to reinforce a center portion of the upper wall portion 45a of the frame portion 45 in the right and left direction by forming the reinforcing ribs 145 on the duct portion 42.

As shown in FIGS. 1 and 9, the duct portion 42 is provided to be continuous with the side wall portion 45b of the frame portion 45, and the side ribs 141 are provided on the duct portion 42. Therefore, the right and left side wall portions 45b are reinforced by the duct portion 42 and the side ribs 141. The second bracket 29 is connected to upper end portions of the reinforced right and left side wall portions 45b and the upper member 27, and the hood lock 35 is provided on the second bracket 29. Therefore, when the hood is opened and closed, for example, a shear force acts on a connection portion between the side wall portion 45b and the second bracket 29 due to a load applied to the hood lock 35, and a downward load is input to the side wall portion 45b.

Here, the side wall portion 45b is reinforced by the duct portion 42 and the side ribs 141. Therefore, the downward load input to the side wall portion 45b can be supported by the side wall portion 45b. Further, the side wall portion 45b is connected to the front end portion of the front side frame 23 via the first bracket 28 and the vehicle body mounting portion 46. Therefore, the load input to the side wall portion 45b can be dispersed to the front side frame 23 via the vehicle body mounting portion 46. Further, the upper member 27 is connected to the damper base 26, and the strength and rigidity are secured by the damper base 26. Therefore, the load acting on the upper member 27 from the second bracket 29 can be supported by the upper member 27. Thus, when the hood is opened and closed, the hood lock 35 can be appropriately supported by the second bracket 29.

As shown in FIGS. 10 and 11, a thickness of the longitudinal wall 52 of the frame portion 45 is reduced toward the duct portion 42 to enlarge the flow path 64.

Cooling performance of the heat exchange unit 22 which will be described later can be improved by reducing the thickness of the longitudinal wall 52 toward the duct portion 42 and enlarging the flow path 64. In addition, a weight of the frame portion 45 (that is, the front end structure 21) can be reduced by reducing the thickness of the longitudinal wall 52 toward the duct portion 42. That is, it is possible to achieve both improvement in the cooling performance of the heat exchange unit 22 and reduction in the weight of the front end structure 21 by reducing the thickness of the longitudinal wall 52 toward the duct portion 42.

Here, the longitudinal wall 52 (that is, the frame portion 45) is a member which forms a framework of the front end structure 21 and is a portion formed to have a larger thickness dimension than that of the duct portion 42 and the like and having the high strength and rigidity. Therefore, even when the thickness of the longitudinal wall 52 is reduced toward the duct portion 42, the strength and rigidity of the frame portion 45 are sufficiently ensured.

Next, an operation of the above-described front end structure 21 will be described. In the following description, the flow of the external air during traveling of the vehicle will be described. In this case, it is assumed that the shutter 34 is fully open and the fan motor 131 is rotating.

As shown in FIGS. 2 and 6, the external air is introduced into the bumper duct 33 through the grille 31 as the vehicle 1 travels. Some of the external air introduced into the bumper duct 33 flows to the first introduction port 61 through the air outlet 82a of the shutter 34 (refer to FIG. 5). The external air flowing toward the first introduction port 61 is introduced into the bulkhead 32 through the first introduction port 61. Some of the external air introduced into the bulkhead 32 is guided rearward by a suction force of the fan motor 131 and then passes through the condenser core 121 and the radiator core 101.

On the other hand, the remaining of the external air introduced into the bulkhead 32 collides with a front surface of the condenser core 121 and then flows upward through the flow path 64 formed between the bulkhead 32 and the condenser 92. Then, the external air is guided rearward by the suction force of the fan motor 131 in a process in which it flows upward in the flow path 64 and passes through the condenser core 121 and the radiator core 101.

Here, in the external air flowing through the flow path 64, the external air which reaches the outer peripheral edge of the condenser core 121 is blocked by the partition portion 43. The external air blocked by the partition portion 43 is guided rearward by the suction force of the fan motor 131 and passes through the condenser core 121 and the radiator core 101.

The external air cools the condenser core 121 and the radiator core 101 by performing heat exchange when passing through the condenser core 121 and the radiator core 101. The external air which has passed through the condenser core 121 and the radiator core 101 is discharged rearward through the air guide hole 132 of the shroud 130.

As described above, in the embodiment, the bulkhead 32 has the partition portion 43 which partitions the inside and outside of the condenser core 121 or the radiator core 101.

According to such a constitution, since the external air flowing along the front surface of the condenser core 121 is blocked by the partition portion 43, it is possible to suppress the outside air from bypassing the condenser core 121 and the radiator core 101. That is, since the external air can be actively passed through the condenser core 121 and the radiator core 101, the cooling performance can be improved.

Moreover, in the embodiment, since the inside and outside of the bulkhead 32 communicate with each other only at the introduction ports 61 and 62 formed at the lower end portion thereof, a front opening portion (for example, the grille 31) of the vehicle body 10 can be reduced. As a result, air resistance can be reduced, and an exterior can be improved. In particular, in the case of an electric vehicle such as the embodiment, a required cooling capacity is smaller than that of a vehicle equipped with an internal combustion engine. Therefore, the efficiency of the cooling performance of the front end structure 21 can be increased, and a size thereof can be reduced.

Further, as described above, for example, mass production is possible, the number of parts is reduced, and the weight can be reduced by integrally molding the bulkhead 32 by injection molding or hot press molding using a composite material such as polypropylene containing glass fiber. Furthermore, the strength and rigidity of the bulkhead 32 can be further increased by integrally molding the bulkhead 32 with a composite material such as a polypropylene resin containing glass fiber or carbon fiber as a reinforcing material.

In the embodiment, the partition portion 43 is constituted to protrude rearward and to extend in a rib shape following the frame portion 45.

According to such a constitution, the rigidity of the bulkhead 32 can be ensured by reinforcing the frame portion 45 with the partition portion 43. Further, since a gap between the condenser 92 and the bulkhead 32 can be restricted over a wide range by the partition portion 43, the external air is appropriately dispersed (diffused) in a two-dimensional direction along the duct portion 42 surrounded by the partition portion 43. Thus, the external air can be actively guided to the condenser core 121 and the radiator core 101, and the cooling performance of the condenser 92 and the radiator 91 can be improved.

Furthermore, the bulkhead 32 is mounted on the vehicle body 10 via a vehicle body mounting portion 46 which extends laterally from the frame portion 45. Therefore, it is easy to secure a mounting margin between the vehicle body 10 and the bulkhead 32, and it is also possible to secure a supporting strength of the bulkhead 32.

In the embodiment, the concave portion 58 through which the bumper beam extension 24 passes is formed in the frame portion 45.

According to such a constitution, since the concave portion 58 is formed in only a part of the frame portion 45, the bulkhead 32 as large as possible can be disposed even in a vehicle type having a narrow width in the right and left direction, for example. Thus, the size of the heat exchange unit 22 accommodated in the bulkhead 32 can be increased.

In the embodiment, the support ribs 50 are provided at the upper and lower end edges of the vehicle body mounting portion 46. According to such a constitution, the rigidity of the vehicle body mounting portion 46 can be secured, and the supporting strength of the bulkhead 32 can be secured.

In the embodiment, on the outside of the partition portion 43, the radiator 91 is in contact with the frame portion 45 via the seal member 112.

According to such a constitution, even when the external air has passed through the partition portion 43, it is possible to suppress the external air from bypassing the condenser core 121 and the radiator core 101.

In the embodiment, the shutter 34 that opens and closes the first introduction port 61 is provided.

According to such a constitution, an amount of external air introduced into the bulkhead 32 can be adjusted by adjusting the opening degree of the shutter 34. Thus, the cooling performance of the heat exchange unit 22 can be adjusted.

Moreover, in the embodiment, the shutter 34 is constituted to be bending deformable by a pressure of the external air at a closed position. Thus, for example, when the vehicle 1 travels in the closed position, the shutter frame 82 approaches or is in contact with an opening edge of the first introduction port 61. Thus, a space between the shutter 34 and the first introduction port 61 can be sealed with a simple constitution. In this case, it is possible to curb so-called recirculation in which warm air of the downstream side (backward) flows backward toward the upstream side (forward). In addition, since there is no need to separately provide a sealing member for sealing between the shutter 34 and the opening edge of the first introduction port 61, the number of parts can be reduced. Further, compared to a constitution in which the shutter 34 and the opening edge of the first introduction port 61 are in close contact with each other, a variation in assembly accuracy can be allowed. For example, it is possible to curb interference of the shutter 34 and the bulkhead 32 with each other and to curb inability to assemble the shutter 34, and the like.

In the embodiment, the second introduction port 62 is formed at a position in the duct portion 42 which does not overlap the shutter 34 in a front view.

According to such a constitution, even when a size of the shutter 34 or the first introduction port 61 is limited due to an influence of peripheral members of the shutter 34 (for example, the bumper beam 25 and the like), the external air can be introduced into the bulkhead 32 through the second introduction port 62.

In the embodiment, a portion of the duct portion 42 connected to the bumper duct 33 is formed to be thicker than other portions.

According to such a constitution, the weight of the bulkhead 32 can be reduced while the mounting strength of the bumper duct 33 is secured.

In the embodiment, the lower wall portion 45c of the frame portion 45 includes the horizontal wall 51, the longitudinal wall 52, and the reinforcing rib 57, and the protruding amount of the reinforcing rib 57 increases rearward.

According to such a constitution, since the rigidity of the horizontal wall 51 can be ensured by the reinforcing rib 57, an accommodation member (for example, the heat exchange unit 22) accommodated in the bulkhead 32 can be stably secured by the horizontal wall 51 while a volume in the bulkhead 32 is secured. In particular, since the protruding amount of the reinforcing rib 57 increases at the rear end portion of the horizontal wall 51 in which a bending moment tends to increase, the rigidity required for the horizontal wall 51 can be secured.

On the other hand, since the connecting member (for example, the shutter 34) connected to the front of the bulkhead 32 is supported by the longitudinal wall 52, the protruding amount of the reinforcing rib 57 at the front end portion of the horizontal wall 51 can be reduced.

As described above, the rigidity of the frame portion 45 can be ensured, and the weight of the bulkhead 32 can be reduced by adjusting the protruding amount of the reinforcing rib 57 according to a necessary place.

In the embodiment, the bulging portion 55 which accommodates the radiator bracket 110 is formed in the frame portion 45, and the radiator bracket 110 is fixed to the bulging portion 55 in the forward and rearward direction.

According to such a constitution, the radiator 91 and the condenser 92 can be accommodated inside the bulkhead 32 and the size and weight of the bulkhead 32 can be reduced by expanding only a part of the frame portion 45.

In the embodiment, the lower tapered portion 76 is formed in a portion of the flow path wall 65 which is located below the straight portion 78.

According to such a constitution, since a cross-sectional area of the flow path 64 increases in the process from the lower tapered portion 76 to the straight portion 78, a vortex is easily generated in the external air as compared with a case in which the cross-sectional area of the flow path is formed uniformly. Therefore, a vector of an upward flow of the external air is reduced, and the external air easily flows rearward.

On the other hand, since the cross-sectional area of the flow path 64 decreases in the process from the straight portion 78 to the upper tapered portion 77, it is more difficult for the external air to flow upward as compared with the case in which the cross-sectional area of the flow path is formed uniformly. Accordingly, the external air can easily flow rearward.

As a result, the cooling performance can be improved.

Other Modified Examples

Although the preferred embodiments of the present invention have been described above, the present invention is not limited to the embodiments. Additions, omissions, substitutions, and other modifications of the constitution can be made without departing from the spirit of the present invention. The present invention is not limited by the above-described description but is limited only by the appended claims.

For example, in the above-described embodiment, the constitution in which the introduction ports 61 and 62 are formed in the lower end portion (a first end portion in the vertical direction) of the duct portion 42 has been described, but the present invention is not limited to this constitution. The introduction ports 61 and 62 may be formed in the upper end portion (a second end in the vertical direction) of the duct portion 42.

In the above-described embodiment, the constitution in which the vehicle body mounting portion 46 extends from the side wall portion 45*b* has been described, but the present invention is not limited to this constitution. The bulkhead 32 may be mounted on the vehicle body 10 (the framework member 20) by various methods.

In the above-described embodiment, although the constitution having the concave portion 58 through which the bumper beam extension 24 passes has been described, the present invention is not limited to this constitution.

In the above-described embodiment, although the case in which the front end structure 21 according to the present invention is mounted on the electric vehicle has been described, the present invention is not limited to this constitution. The front end structure 21 can be mounted on various vehicles.

In the above-described embodiment, although the constitution in which the partition portion 43 is formed in a rib shape following the frame portion 45 has been described, the present invention is not limited to this constitution. The shape and the like of the partition portion 43 can be changed as appropriate. In this case, it becomes easier to guide the external air in the vertical direction along the front surface of the condenser core 121 by extending the partition portion 43 in the vertical direction. On the other hand, the flow of the external air in the vertical direction can be appropriately restricted by extending the partition portion 43 in the right and left direction.

Further, the partition portion 43 may be formed on at least one of the frame portion 45 and the duct portion 42.

In the above-described embodiment, although the constitution in which the radiator 91 and the frame portion 45 are in close contact with each other via the seal member 112 has been described, the present invention is not limited to this constitution. For example, the condenser 92 may be in close contact with the frame portion 45 or the duct portion 42 via a seal member.

In the above-described embodiment, although the case in which the hood lock is provided on the outside of the bulkhead 32 in the right and left direction has been described, the present invention is not limited to this constitution. The hood lock may be provided indirectly or directly at the center of the bulkhead in the right and left direction. In this case, in the embodiment, since the reinforcing ribs 145 are provided on the duct portion 42, when the hood lock is mounted on a center portion of the upper wall portion 45*a* in the right and left direction, the strength when the hood is opened and closed (that is, a hood opening and closing strength) can be secured. In addition, the strength and rigidity of the bulkhead 32 can be further increased with a simple constitution.

Further, in the above-described embodiment, although the constitution in which the hood lock 35 is provided on the second bracket 29 has been described, the present invention is not limited to this constitution. The hood lock 35 may be provided on the first bracket 28 without providing the second bracket 29. In this case, the second bracket 29 can be omitted.

In the above-described embodiment, although the constitution in which the duct portion 42 protrudes upward and downward with respect to the vehicle body mounting portion 46 has been described, the present invention is not limited to this constitution. At least a part of the duct portion 42 may be located above the vehicle body mounting portion 46.

In the above-described embodiment, although the constitution in which the partition portion 43 and the reinforcing rib 145 are provided in the duct portion 42 has been described, the present invention is not limited to this constitution. The partition portion 43 and the reinforcing rib 145 are not essential components.

In the above-described embodiment, although the constitution in which the introduction ports 61 and 62 are formed in the lower portion of the duct portion 42 has been described, the present invention is not limited to this constitution. The introduction ports may be provided in the frame portion or the like.

While preferred embodiments of the invention have been described and shown above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES

10 Vehicle body
21 Front end structure
23 Front side frame
26 Damper base
27 Upper member
29 Second bracket (bracket)
35 Hood lock
42 Duct portion
43 Partition portion
45 Frame portion
45*a* Upper wall portion
45*b* Side wall portion
46 Vehicle body mounting portion
61 First introduction port (introduction port)
62 Second introduction port (introduction port)
64 Flow path
91 Radiator (heat exchanger)
92 Condenser (heat exchanger)
100 Radiator tank (outer peripheral area)
101 Radiator core (heat exchanger area)
121 Condenser core (heat exchanger area)
120 Condenser tank (outer peripheral area)
140 Upper rib
141 Side rib
142 Lower rib
145 Reinforcing rib

What is claimed is:

1. A front end structure comprising:
a frame portion which covers an outer peripheral portion of a heat exchanger disposed at a front portion of a vehicle body;
a vehicle body mounting portion provided on the frame portion and connected to a front end portion of a front side frame which extends in a forward and rearward direction of the vehicle body; and a duct portion which is continuous with a front end of the frame portion, at least a part of which is disposed above the vehicle body mounting portion, and which forms a flow path that is continuous in a vertical direction between thereof and the heat exchanger, wherein the frame portion, the vehicle body mounting portion, and the duct portion are integrally formed.

2. The front end structure according to claim 1, wherein:

an introduction port which communicates with the flow path is formed at a lower portion of the duct portion, and a partition portion which partitions between a heat exchange area through which external air is able to pass in a forward and rearward direction, and an outer peripheral area located on an outer peripheral side with respect to the heat exchange area in the heat exchanger is provided at at least one of the frame portion and the duct portion.

3. The front end structure according to claim 2, wherein the partition portion extends in a rib shape following the frame portion and protrudes rearward.

4. The front end structure according to claim 1, wherein the duct portion is located forward from the vehicle body mounting portion.

5. The front end structure according to claim 1, wherein a reinforcing rib which extends in a right and left direction as it goes downward from a center portion in the right and left direction in a portion of the frame portion located near an upper wall portion is provided at the duct portion.

6. The front end structure according to claim 1, wherein a thickness of the frame portion decreases toward the duct portion to enlarge the flow path.

7. The front end structure according to claim 1, further comprising:

a bracket coupled to an upper end of a side wall portion of the frame portion and connected to an upper member to which a damper base is coupled; and a hood lock provided on the bracket.

* * * * *